(12) United States Patent
Schisler et al.

(10) Patent No.: US 6,561,500 B2
(45) Date of Patent: May 13, 2003

(54) HYDRO-DAMPED AIR SPRING

(75) Inventors: Robert Charles Schisler, Munroe Falls, OH (US); Edwin Lee Haines, Wake Forest, NC (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/802,525

(22) Filed: Mar. 7, 2001

(65) Prior Publication Data

US 2002/0125622 A1 Sep. 12, 2002

(51) Int. Cl.[7] .................................................. F16F 9/04
(52) U.S. Cl. .................................. 267/64.27; 267/64.13
(58) Field of Search .......................... 267/64.28, 64.13, 267/64.19, 64.23, 64.27, 219, 292, 294

(56) References Cited

U.S. PATENT DOCUMENTS

| | | | | |
|---|---|---|---|---|
| 4,424,960 A | * | 1/1984 | Dan et al. ............... | 267/140.13 |
| 4,474,267 A | * | 10/1984 | Empson .................... | 105/198.1 |
| 4,493,481 A | * | 1/1985 | Merkle ..................... | 267/64.24 |
| 4,629,170 A | * | 12/1986 | Warmuth, II ............. | 267/64.21 |
| 4,858,733 A | * | 8/1989 | Noguchi et al. ......... | 188/267.1 |
| 4,867,043 A | * | 9/1989 | Antkowiak ............. | 188/322.17 |
| 5,029,824 A | * | 7/1991 | LaBeau et al. ......... | 267/140.13 |
| 5,570,866 A | * | 11/1996 | Stephens .................... | 248/550 |
| 5,601,164 A | * | 2/1997 | Ohsaki et al. ......... | 188/264 CC |
| 5,954,316 A | * | 9/1999 | Voss ......................... | 267/64.21 |
| 6,234,460 B1 | * | 5/2001 | Arnold ....................... | 267/122 |
| 6,364,294 B1 | * | 4/2002 | Gennesseaux et al. . | 267/140.13 |

* cited by examiner

*Primary Examiner*—Christopher P. Schwartz
*Assistant Examiner*—Devon Kramer
(74) *Attorney, Agent, or Firm*—Nancy T. Krawczyk

(57) ABSTRACT

The air spring of the present invention combines both traditional air spring characteristics and components with internal hydro damping. The air spring has an upper retainer, a piston, an elastomeric sleeve secured to the upper retainer at a first end and secured to the piston at the lower end, and a damping device. The damping device has an upper and a lower variable volume chamber and a channel connecting the two variable volume chambers, and a damping fluid contained within the damping device.

10 Claims, 9 Drawing Sheets

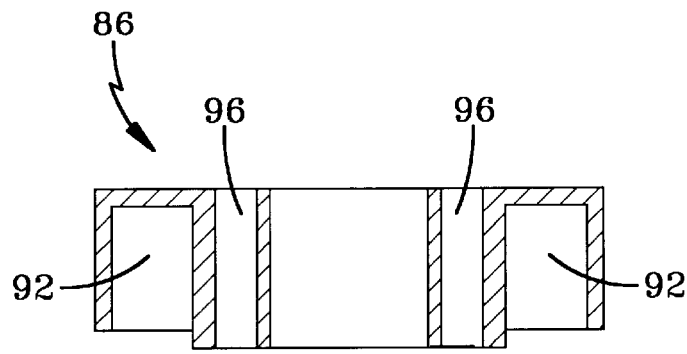
FIG-4C
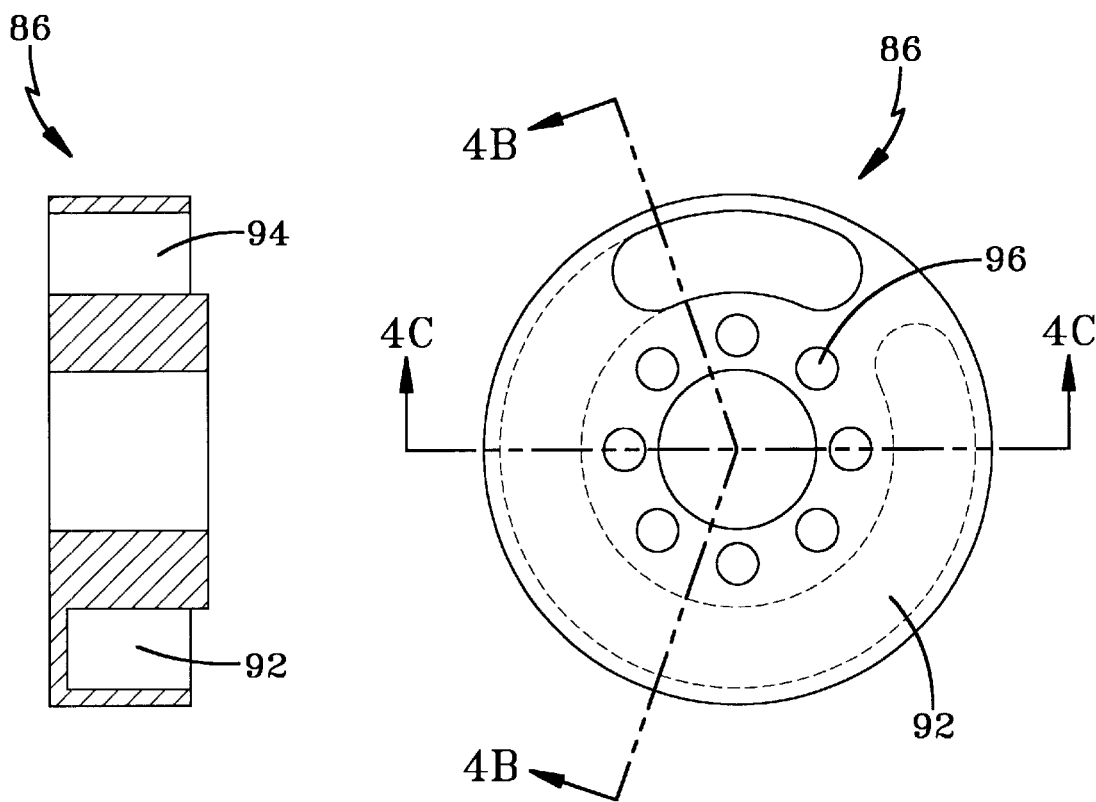
FIG-4B
FIG-4A

HYDRO-DAMPED AIR SPRING

FIELD OF THE INVENTION

The present invention relates to air springs. In particular, the invention is directed to a hydro-damped air spring.

BACKGROUND OF THE INVENTION

Air springs have been used for motor vehicles and various machines and other equipment for a number of years. The springs are designed to support a suspension load such as a vehicle. The springs are often combined with a separate shock absorber device in the suspension that functions to dampen oscillations. The air spring usually consists of a flexible elastomeric reinforced sleeve that extends between a pair of end members. The sleeve is attached to end members to form a pressurized chamber therein. The end members mount the air spring on spaced components or parts of the vehicle or equipment on which the air spring is to be mounted.

The internal pressurized gas, usually air, absorbs most of the motion impressed upon or experienced by one of the spaced end members by which the air spring is mounted. The end members move inwards and towards each other and also away and outwards from each other as the motion of the suspension requires.

SUMMARY OF THE INVENTION

The air spring of the present invention combines both traditional air spring characteristics and components with internal hydro damping. The air spring has an upper retainer, a piston, an elastomeric sleeve secured to the upper retainer at a first end and secured to the piston at the lower end, and a damping device. The damping device has an upper and a lower variable volume chamber and a channel connecting the two variable volume chambers, and a damping fluid contained within the damping device.

In an aspect of the invention, one of the variable volume chambers may have a bellows configuration. The sleeve forming the bellows may be made from a reinforced elastomeric sleeve or may be a molded sleeve. The corrugations in the bellows may be formed from a series of external rings, molded in rings, or elongated rings.

In another aspect of the invention, the lower variable volume chamber is located within the piston and the upper variable volume chamber is located within a chamber formed by the secured elastomeric sleeve.

In other aspects of the invention, the channel connecting the two variable volume chambers is a continuous circular channel. To assist the channel in the flow of the damping fluid, and reduce excessive forces in the suspension, the damping device may have a quick relief valve.

BRIEF DESCRIPTION OF THE DRAWINGS

The invention will be described by way of example and with reference to the accompanying drawings in which:

FIGS. 4A–4C are the lower damping channel plate;

DETAILED DESCRIPTION OF THE PREFERRED EMBODIMENTS

Figure 1:
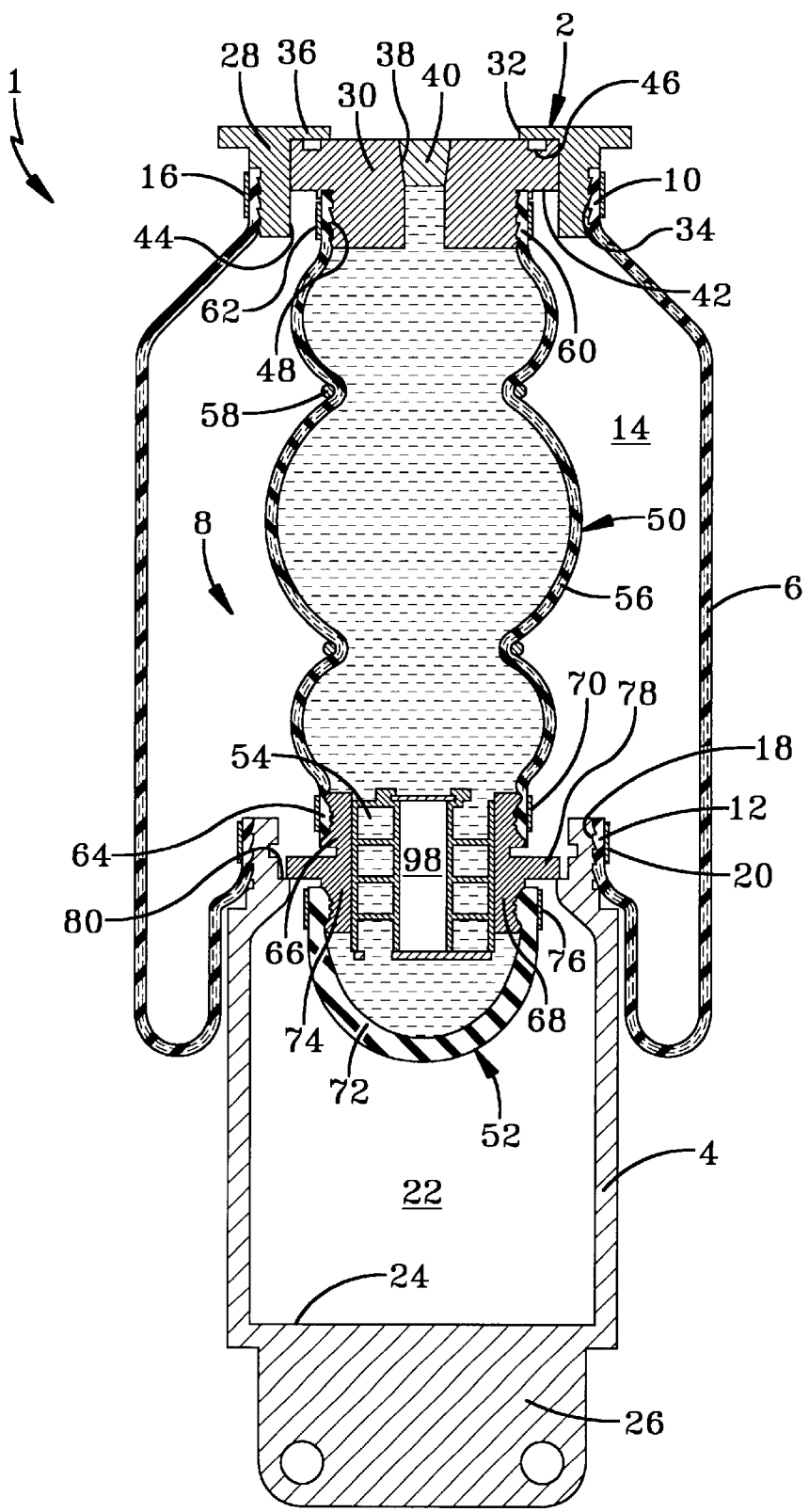
FIG. 1 is one embodiment of the hydro-damped air spring.

FIG. 1 illustrates the inventive air spring 1. The air spring 1 has four main components, the upper retainer 2, the piston 4, the elastomeric sleeve 6 and the damping device 8. The elastomeric sleeve 6 is secured at first end 10 to the upper retainer 2 and to the piston 4 at the opposing end 12, forming a chamber 14.

The elastomeric sleeve 6 is preferably comprised of at least 3 plies: an outer elastomeric ply, at least one reinforcing ply formed of elastomeric embedded reinforcing cords, and an inner elastomeric ply. In the illustrated sleeve 6, the upper end 10 of the sleeve 6 is secured onto the upper retainer 2 by means of a clamping ring 16 in a conventional manner, similar to that disclosed in U.S. Pat. No. 5,005,808. Alternatively, the upper sleeve end 10 may have an inextensible bead about which the upper retainer 2 is crimped for securing the sleeve end 10, similar to those disclosed in U.S. Pat. No. 5,535,994 or 5,580,033. Similarly, the lower sleeve end 12 is secured to the piston 4 at the clamping region 18 of the piston by means of a clamping ring 20. Alternatively the ends of the sleeve may be secured to the upper retainer 2 or piston 4 by any other attachment methods that are commonly known in the air spring or hose industries. Additionally, while not illustrated, the upper retainer 2 may also be provided with means to secure the air spring 1 to a suspension.

When the air spring 1 is in use, the upper retainer 2 and the piston 4 move axially toward and away from each other, and the sleeve 6 travels up and down the sides of the piston 4. The piston 4 is illustrated as a straight sided piston; however, the sides of the piston 4 may flare out or flare in as needed to tune the suspension performance. The piston 4 has an internal chamber 22 formed by the base plate 24. The piston 4 has a mounting plate 26 for mounting the air spring 1. Alternatively, any commonly known fastening methods are suitable (examples: threaded fasteners, pinned connections, snap-in couplings, etc.).

The retainer 2 has a two part construction with an outer main ring 28 and an inner mounting ring 30. The outer main ring 28 has a circular configuration with a central orifice 32 and an extending clamping collar 34. The central orifice 32 has an extending ledge 36 for restraining the inner mounting ring 30. The inner mounting ring 30 has a central orifice 38 which is sealed by a plug 40. The inner mounting ring 30 has an extending ledge 42 abutting against the inner surface 44 of the extending clamping collar 34. To form an air tight seal between the inner and outer rings 28, 30, an o-ring may be provided in groove 46. The inner ring 30 has an extending clamping collar 48.

While not illustrated, the air spring 1 is also provided with means to introduce a gas into the chamber 14. Air inlet means may be provided in the upper retainer 2 or in the piston 4.

The damping device 8 has an upper variable volume chamber 50, a lower variable volume chamber 52, and damping channel 54 connecting the two chambers 50, 52. The upper chamber 50 is formed as a bellows from an elastomeric sleeve 56, similar in construction to the elastomeric sleeve 6, and may be formed into the bellows configuration by either a serious of rings 58 that encircle the sleeve 56 or the sleeve 56 may be molded into the bellows or accordion like configuration. The relative lengths of each bellows section may be equal or may vary depending upon the desired damping characteristics of the air spring 1. The rings 58 that form the bellows may be single rings or multiple rings of different sizes may be positioned at each location to enhance the pumping action of the bellows.

The upper end 60 of the upper chamber 50 is secured to the extending clamping collar 48 of the inner ring 30 by crimping ring 62. The lower end 64 of the chamber 50 is secured to an upper extending clamping collar 66 of the intermediate piston plate 68 by crimping ring 70. While the chamber 50 is shown as being secured at both ends by crimping rings 62, 70, it would be appreciated by those skilled in the art that the ends of the chamber may be secured to either the inner ring 30 or the intermediate piston plate 68 by crimped over bead rings or other common attachment methods as discussed above in regards to the sleeve 6. An incompressible damping fluid is introduced into the chamber 50 through the central orifice 38.

The damping fluid may be any conventional incompressible damping fluid such as hydraulic fluid, glycol, or even water. Whatever damping fluid is chosen, it should be non-reactive and non-degrading with the components of the air spring 1 that it contacts.

The lower variable volume chamber 52 of the damping device 8 is located within the piston chamber 22. The lower chamber 52 is formed by an elastomeric cap 72. The elastomeric cap 72 is secured to the lower extending clamping collar 74 of the intermediate piston plate 68 by the crimping ring 76. Alternatively, the elastomeric cap may be attached by other commonly known means such as rubber bonding, threaded fastening, etc. The elastomeric cap 72 is formed from a single thick ply of elastomeric material. The elasticity of the elastomeric cap 72 should permit expansion of the volume of the lower chamber 52. The elastomeric cap 72 can be made of any elastomeric compound that has sufficient strength and elongation characteristics, and is not adversely affected by the damping fluid used in the part.

The damping performance of the air spring can also be tuned by varying the amount of damping fluid added to the damping device 8 (FIG. 1), such that the elastomeric cap 72 is partially inflated at the spring design height, thus providing a pressure in the damping fluid higher than the pressure in the surrounding gas in the air spring. In this operating mode, the damping device supports a greater fraction of the suspension load (compared to non-pressurized damping fluid), and the damping device can provide more intense suspension damping on the rebound (extension) portion of the suspension motion.

For use with ethylene glycol based fluids, a 50 durometer (Shore A) natural rubber compound with 3700 psi tensile strength and 480% elongation is preferred. Many different elastomeric compounds are suitable for forming the elastomeric cap 72, as will be apparent to those skilled in the art of rubber compounding.

Figure 2:
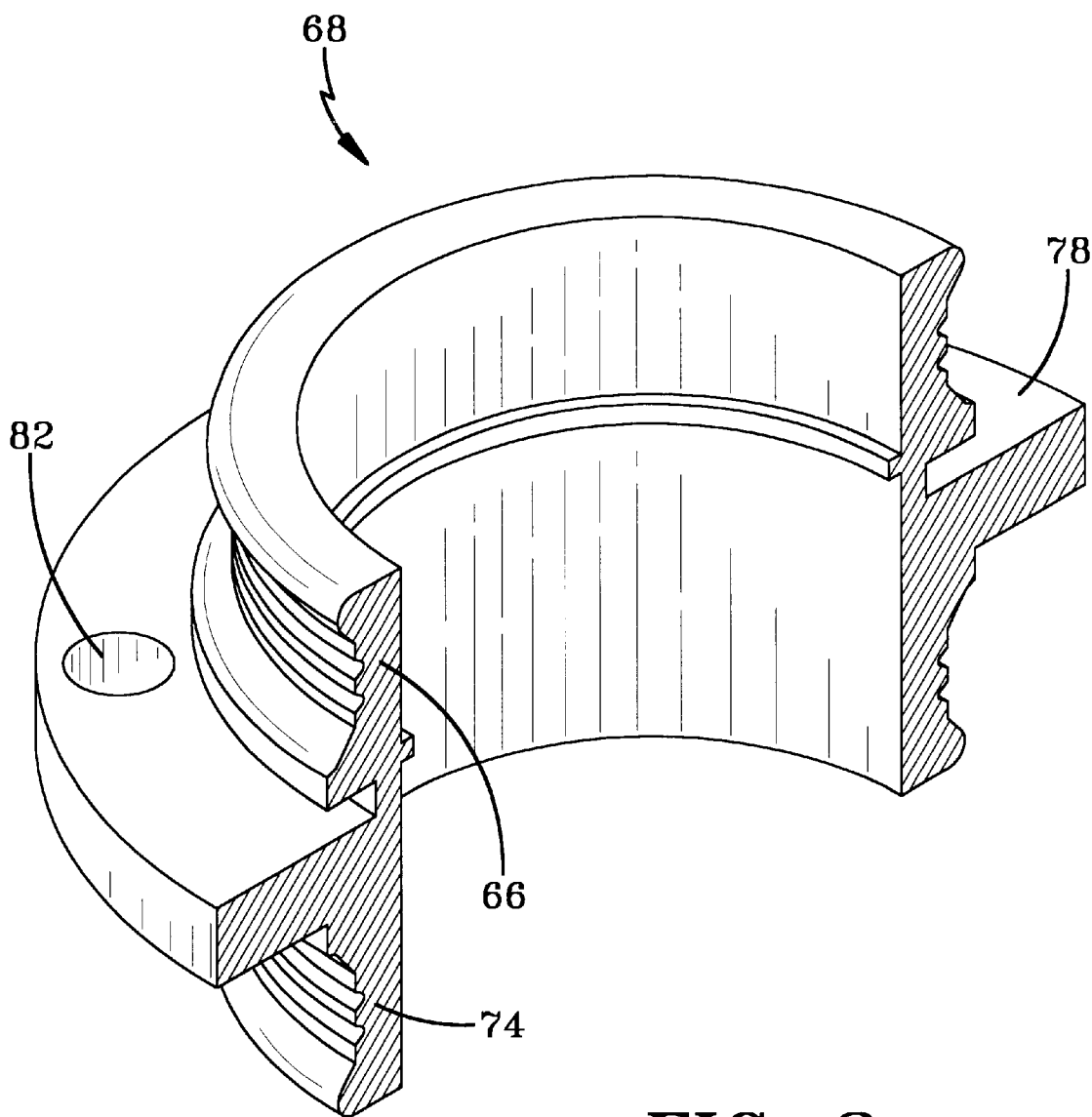
FIG. 2 is the intermediate piston plate.

Between the upper chamber 50 and the lower chamber 52 is the intermediate piston plate 68, more clearly illustrated in FIG. 2. The intermediate piston plate 68 has an extending ring 78 that rests on the piston seat 80. Piston plate 68 may be fastened to piston 4 by snap rings, threaded fasteners, pins or any other common attachment method. Along the extending ring 78 are a plurality of apertures 82 which permit gas to flow from the upper chamber 14 to the piston chamber 22. These apertures 82 may be varied in size or eliminated to tune the performance of the air spring.

Figure 3C:
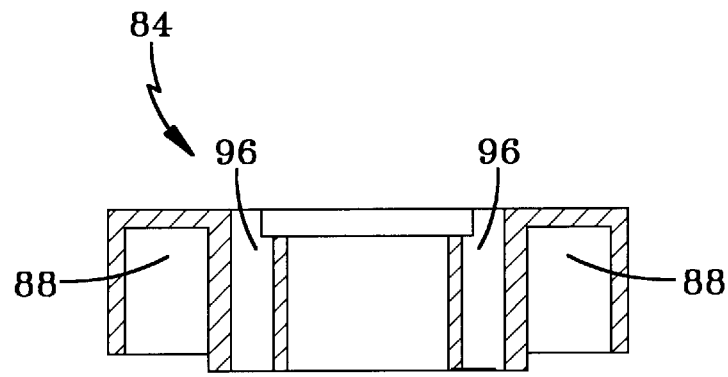
FIGS. 3A–3C are the upper damping channel plate.
Figure 3B:
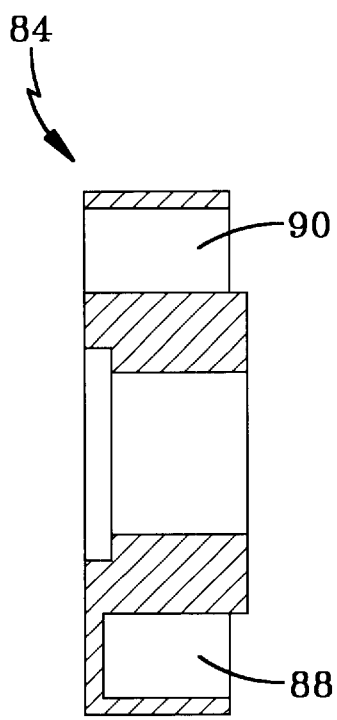
Figure 3A:
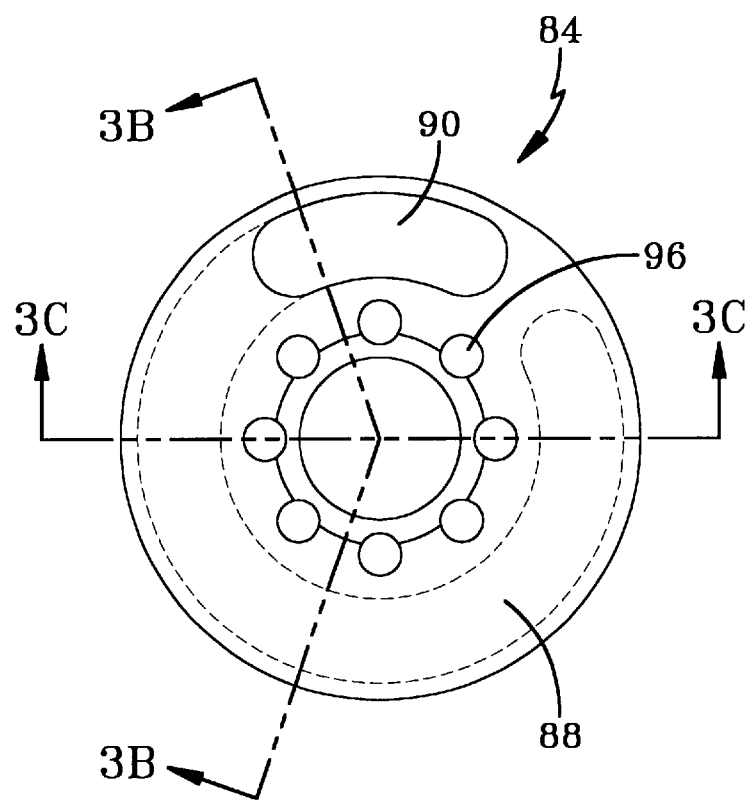

Within the center of the intermediate piston plate 68 is the damping channel 54, see FIG. 1. The damping channel 54 controls the amount and direction of fluid passing between the upper and lower chambers 50, 52. The damping channel 54 is formed from one upper damping channel plate 84 and at least one lower damping channel plate 86. The upper damping channel plate 84 is shown in FIGS. 3A, 3B, and 3C. The lower damping channel plate 86 is shown in FIGS. 4A, 4B, and 4C.

The upper damping channel plate 84 is positioned within the intermediate piston plate 68 facing closest to the upper chamber 50. Fluid from upper chamber 50 enters plate 84 through aperture 90, the fluid then enters an arcuate groove 88 about the plate 84 in which the damping fluid travels. The next adjacent plate damping channel plate is the lower damping channel plate 86. The fluid enters the lower plate 86 by aperture 94 and travels through the arcuate groove 92, which provides a path for the fluid in plate 86. The arcuate groove 92 in the lower damping channel 86 either leads to either the lower chamber 52 or to an aperture in a third plate if another plate is present.

When the plates 84, 86 are stacked on top of each other, a continuous stack of circular damping channel 54 is created through which the damping fluid travels. The length, as dictated by the length of each arcuate groove 88, 92 and the number of lower plates 86 used, and the bore of the damping channels 54 are set during the design of the air spring 1 to provide the optimum damping frequency and intensity for the desired suspension application.

In each plate 84,86, there are a series of holes 96 in which to thread connecting members to connect the plates 84, 86 together. The center of the plates 84, 86 is also opened to form a column 98 when the plates 84, 86 are connected. This column 98 may be closed, as seen in FIG. 1, or provided with a pressure relief valve as shown in FIG. 5.

Figure 9:
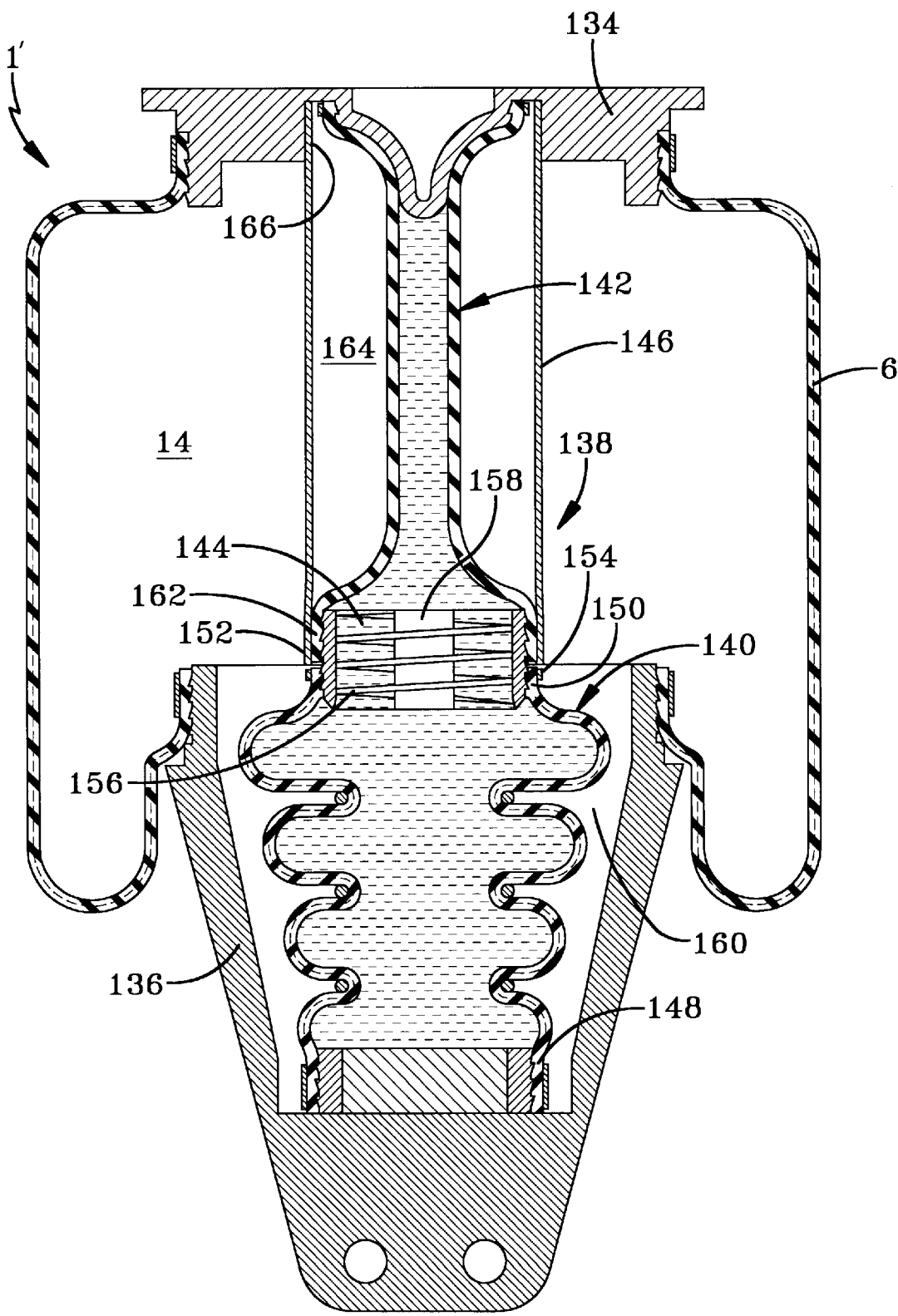
FIG. 9 is another embodiment of the air spring.

Alternative to the series of illustrated plates, a single spiral plate may be employed, see FIG. 9. Such a plate would have a circular path traveling around a central column.

Operation of the air spring 1 occurs in the following manner. As suspension motion causes the air spring 1 to stroke, the movement also causes a fluid pumping action in the upper chamber 50 that forces the damping fluid through the damping channel 54 into the lower chamber 52. Simultaneous during the downward stroke of the air spring 1, as the upper retainer 2 moves toward the piston 4, the gas present in the chamber 14 is displaced into the piston chamber 22 through the apertures 82 in the intermediate piston plate 68. Due to the nature of the elastomeric cap 72 forming the lower chamber 52, after an expansion of the chamber 52, the chamber 52 contracts back to its original size and forces the damping fluid back through the damping channel 54 and into the upper chamber 50 on the return stroke. The increasing pressure of gas in the piston chamber 22 assists in forcing the expanded lower chamber 52 to contract. As the fluid travels back into the upper chamber 50, the upper chamber 50 expands, assisting the air spring 1 in the rebound movement.

Figure 5:
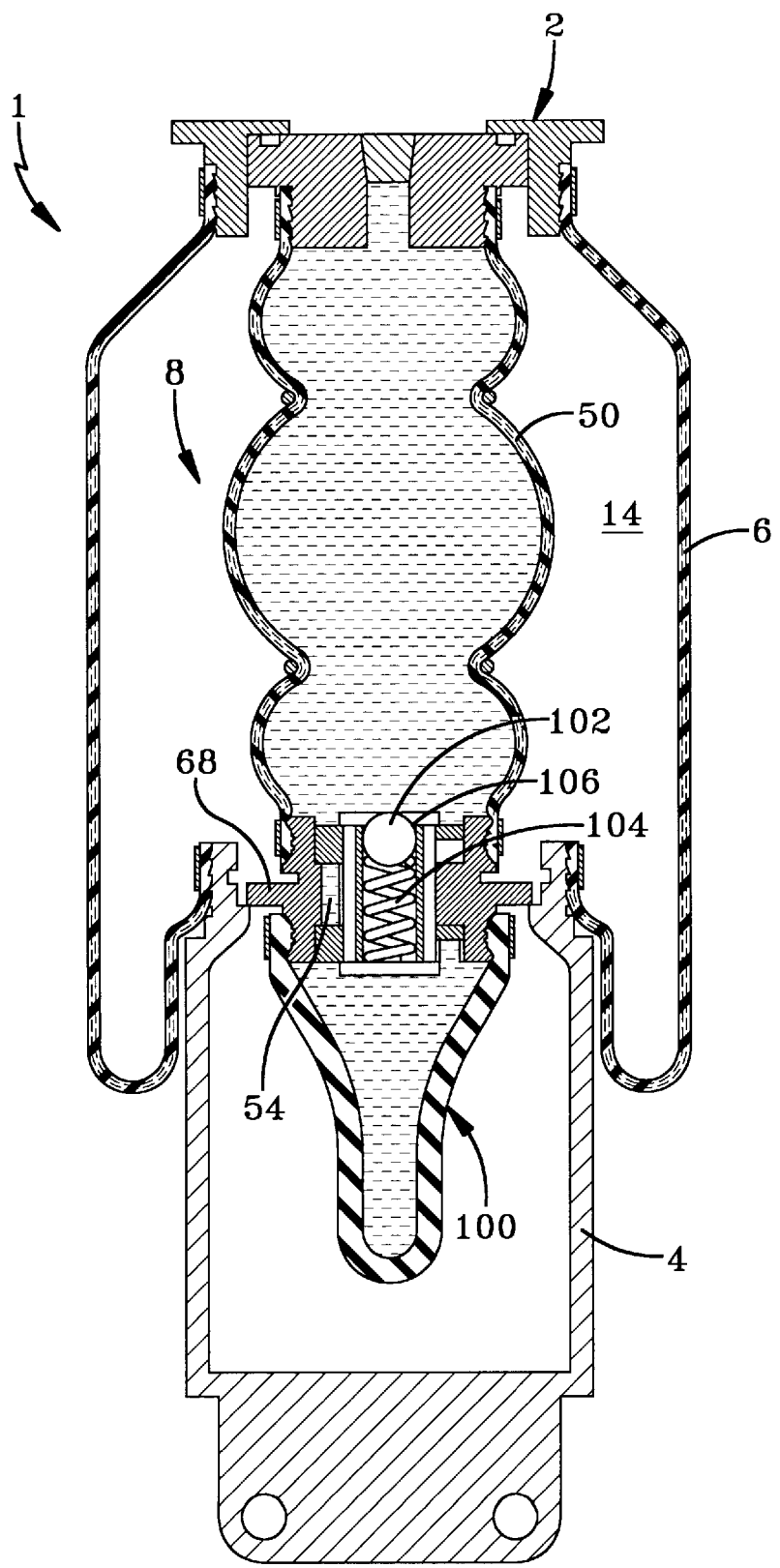
FIG. 5 is a second embodiment of the air spring.

FIG. 5 is another embodiment of the present invention. For convenience, items which are the same as in the first embodiment employ the same reference number. The air spring 1 has a two part upper retainer 2, a piston 4, an elastomeric sleeve 6, and a damping device 8. The damping device 8 has an upper chamber 50, a lower chamber 100, and a damping channel 54 to control the flow of fluid from between the upper and lower chambers 50, 100.

The lower chamber 100 has an extended drip configuration differing from the semi-circular configuration of the lower chamber 52 of the first embodiment. The lower chamber 100 is also made of a material selected for its rebound and elasticity characteristics.

The damping channel 54 is set radially within the intermediate piston plate 68. The damping channel flows about a pressure relief valve. In the illustrated air spring 1, the pressure relief valve is a ball 102 and spring 104. The pressure relief valve is activated when there is a sudden high compressive force acting on the air spring 1. When the upper chamber 50 is compressed, if the pressure is greater than is desired for optimum suspension performance, then the ball 102 is forced out of the seat 106 and pushes down on the pre-tensioned spring 104, allowing fluid to travel from the upper chamber 50 to the lower chamber 100. Once the fluid pressure drops to the designed level, the ball 102 reseats itself and the pressure relief valve is closed.

Figure 6:
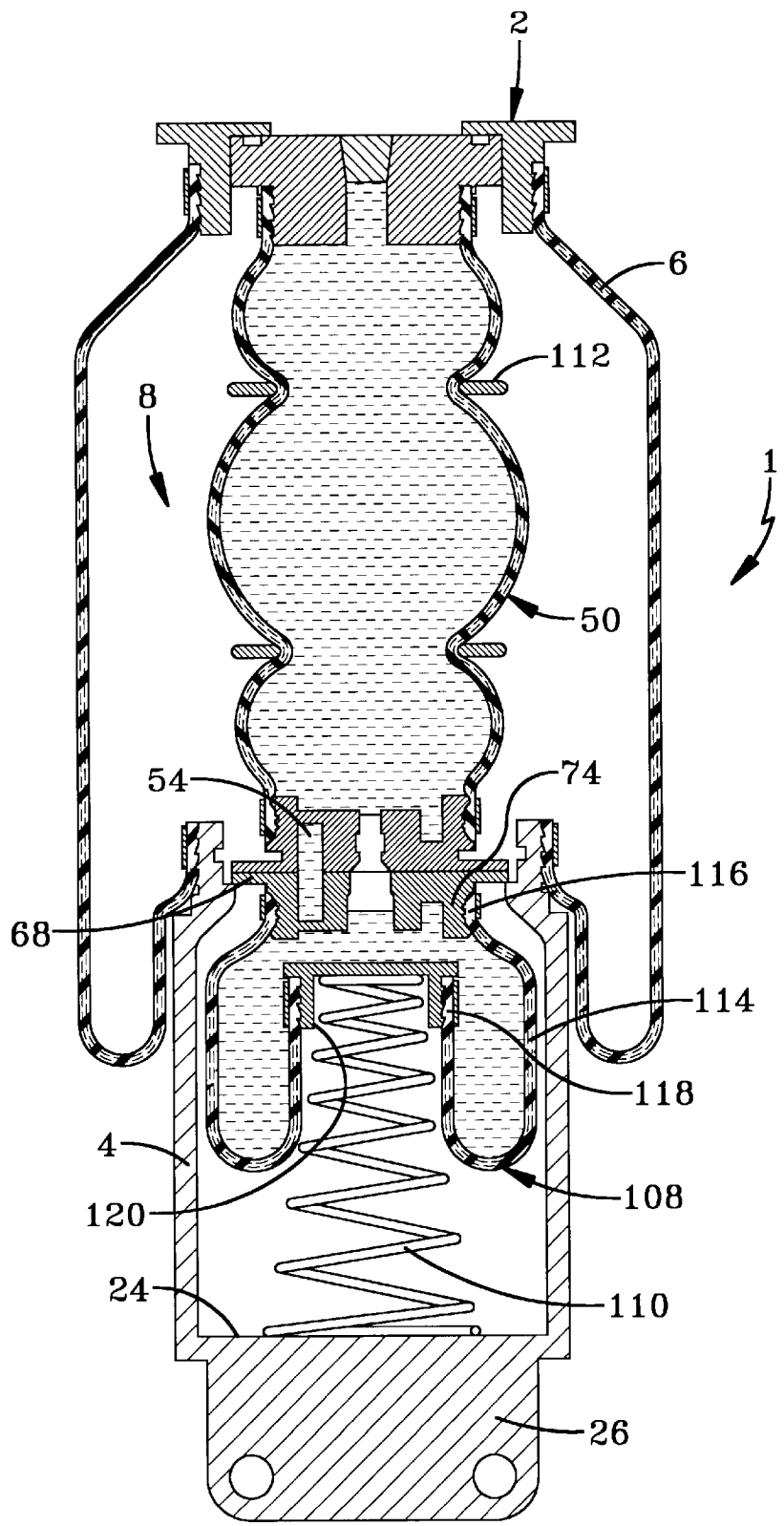
FIG. 6 is a third embodiment of the air spring.

FIG. 6 shows another embodiment of the present invention. The air spring 1 has a two part upper retainer 2, a piston 4, an elastomeric sleeve 6, and a damping device 8. The damping device 8 has an upper chamber 50, a lower chamber 108, a pretensioned spring 110, and a damping channel 54.

The upper chamber 50 is formed into a bellows configuration by a series of extending elongated flat rings 112. The rings 112 extend out a radial width that can be as wide as the greatest width of the upper chamber 50 when the air spring 1 is in neither the joust or rebound state, as illustrated. The rings are sized to control the pumping force of the bellows to achieve the desired air spring performance.

The lower chamber 108 is formed from an elastomeric sleeve 114. The sleeve 114 is similar in construction to the sleeve 56. The sleeve upper end 116 is crimped onto the lower crimping collar 74 of the intermediate piston ring 68. The sleeve lower end 118 is crimped onto a lower internal retainer 120. Extending from the piston base 24 to the underside of the internal retainer 120 is the pretensioned spring 110. The spring 110 has a triangular configuration so that when the spring 100 is compressed, the spring 110 coils within itself, taking up the least amount of space when in a compressed state. As in the previous embodiments, the damping channel 54 is a circular channel permitting the damping fluid to flow between the upper chamber 50 and the lower chamber 108.

Figure 7:
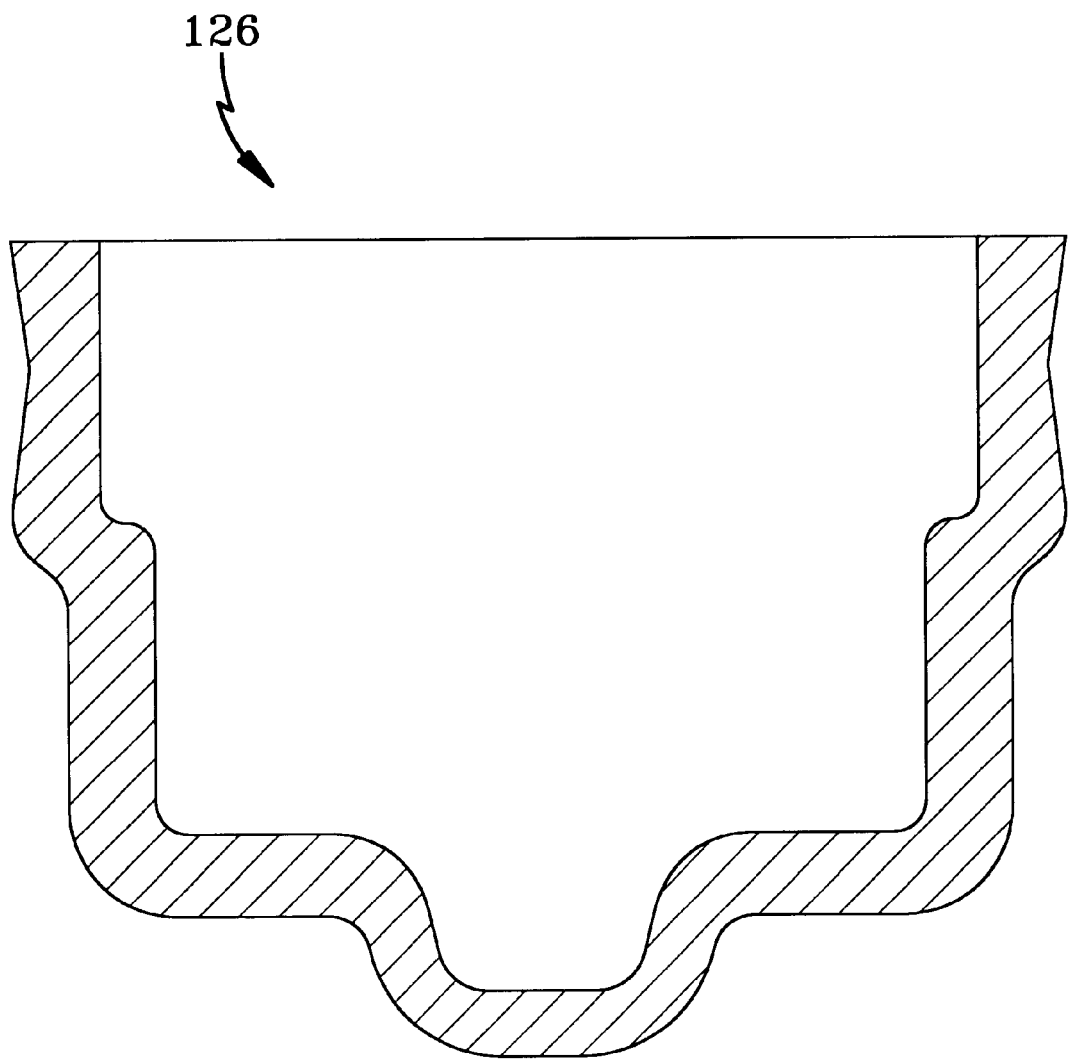
FIG. 7 is an alternative construction for the elastomeric cap.
Figure 8:
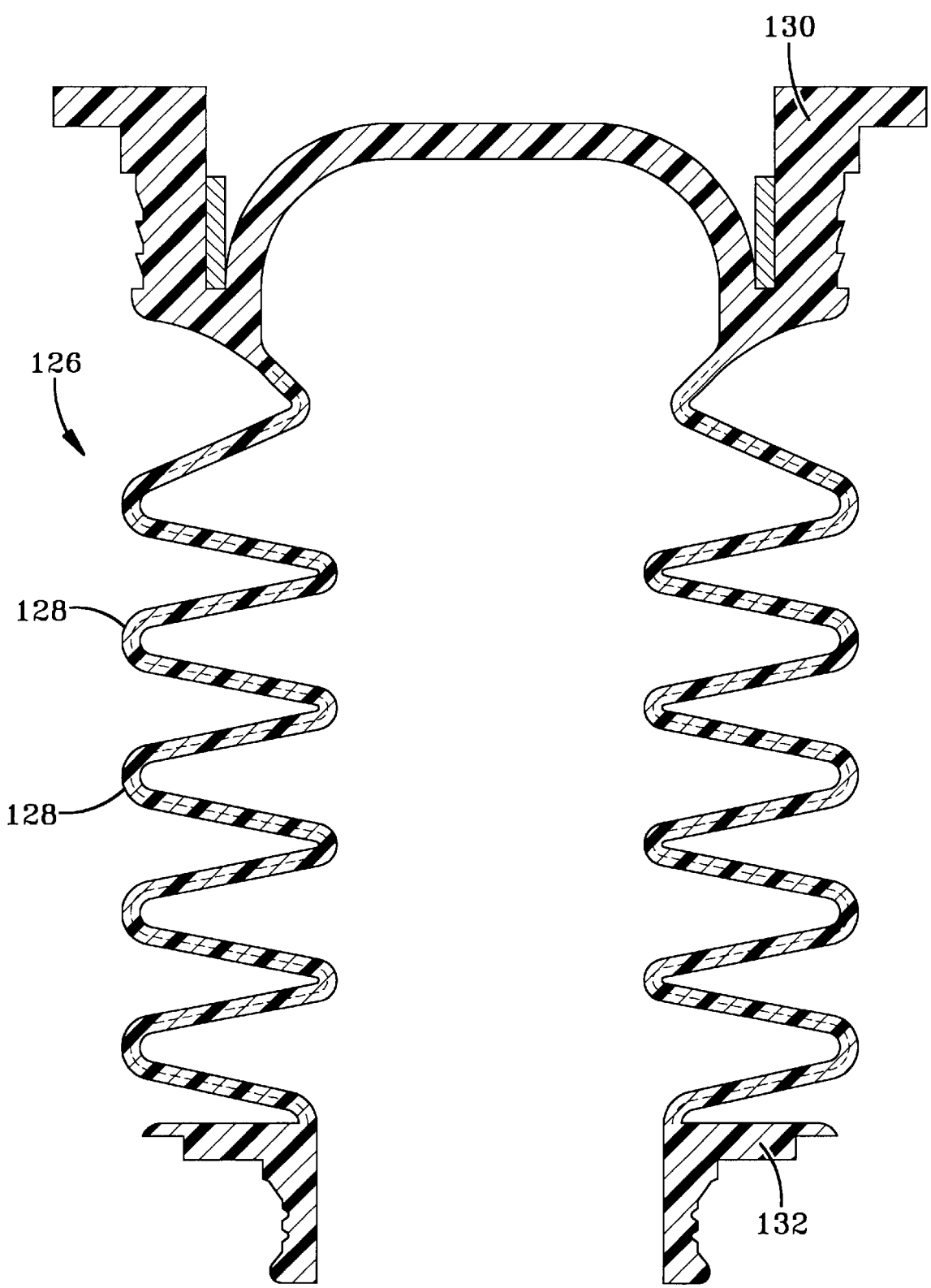
FIG. 8 is an alternative construction for the bellows.

Other variations in the construction of the air spring 1 are illustrated in FIGS. 7 through 9.

FIG. 7 shows another configuration for an elastomeric cap 126 to form the fluid reservoir 52.

FIG. 8 is an example of another method of forming the upper chamber. The upper chamber 126 has a central portion with multiple corrugations 128. The upper portion is molded to form an upper retainer 130 and the lower portion is molded to form an intermediate piston plate 132.

In the air spring 1' of FIG. 9, the air spring 1 has an upper retainer 134, an elastomeric sleeve 6, a piston 136, and an internal damping device 138. The damping device 138 has a lower variable volume chamber 140, an upper variable volume chamber 142, a damping channel 144, and internal piston 146.

The lower end 148 of the chamber 140 is secured within the piston and the upper end 150 is crimped to the external surface of the damping channel 144 by a crimping ring 154. A single spiral plate 156 forms the damping channel 144 around a central column 158. Above the retaining ring and the damping channel, and contained within the internal piston 146, is the upper chamber 142. The chamber 142 has a sleeve construction and is crimped to the upper retainer 134 at a first end and is secured between the spiral plate 156 and the piston at the lower end 162. The lower chamber 140 and the upper chamber 142 are filled with damping fluid.

Operation of the air spring 1' is as follows. When the air spring 1' is in jounce, as the upper retainer 134 moves toward the piston 136, the internal piston 146 is free to move into the piston chamber 160. As the lower end 152 of the internal piston 146 is attached to the upper end 150 of the lower chamber 140, the damping channel 144 and the lower end 162 of the upper chamber 142, when the internal piston end 152 enters into the piston chamber 160, the lower chamber 140 is compressed, and the damping fluid is forced through the damping channel 144 into the upper chamber 142. The upper chamber 142 expands into the chamber 164 formed by the internal piston.

When the air spring 1' is in rebound, the lower end 152 of the internal piston 146 retreats from the piston chamber 160 as the upper end 166 of the internal piston 146 is fixedly attached to the upper retainer 134. The volume of the lower chamber 140 increases and the fluid pressure in the upper chamber 142 becomes greater than the fluid pressure in the lower chamber 140 and the damping fluid flows through the damping channel 144 from the upper chamber 142 into the lower chamber 140.

It should also be noted that the piston 136 has a differing configuration than the piston 4. The piston 4, 136 may have any configuration so long as there is sufficient space within the piston chamber 22, 160 for either the expanding reservoir or the expanding and compressing bellows. Additionally, the various elements of the air spring disclosed herein, such as the construction of the upper chamber 50, the type of restraining rings for the sleeve 56, the configuration of the lower reservoir 52, the configuration of the damping channel 54, the use of a pressure relief valve, etc., can be varied in order to achieve an air spring with the desired damping characteristics.

The air spring of the present invention, that is, an air spring that combines both traditional air spring characteristics and components with internal hydro damping, eliminates the need for a separate shock absorber damper in the suspension system of a vehicle. Additionally, the air spring enables the designer to optimize the damping frequency and intensity for a particular suspension application.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air spring comprising an upper retainer, a piston, an elastomeric sleeve secured to the upper retainer at a first end and secured to the piston at the lower end forming a chamber, and a damping device, the air spring being characterized by:

the damping device being comprised of an upper and a lower variable volume chamber and a channel connecting the two variable volume chambers, and a damping fluid contained within the damping device wherein the damping device is a closed volume with no communication of the damping fluid to the chamber.

2. An air spring in accordance with claim 1 wherein one of the variable volume chambers are elastomeric.

3. An air spring in accordance with claim 1 wherein the upper variable volume chamber is formed into a bellows configuration by at least one elongated ring.

4. An air spring in accordance with claim 1 wherein the lower variable volume chamber is located within the piston and the upper variable volume chamber is located within the chamber formed by the secured elastomeric sleeve.

5. An air spring in accordance with claim 1 wherein one of the variable volume chambers has a bellows type configuration.

6. An air spring in accordance with claim 1 wherein the damping device is further comprised of a quick relief valve.

7. An air spring in accordance with claim 1 wherein the channel connecting the two variable volume chamber is a series of continuous circular channels or a continuous spiral channel.

8. An air spring in accordance with claim 1 wherein the lower variable volume chamber is fixedly secured to the base of the piston.

9. An air spring in accordance with claim 1 wherein the upper variable volume chamber is secured within an inner piston.

10. An air spring in accordance with claim 1 wherein the damping fluid has a pressure higher than the surrounding air pressure inside the elastomeric sleeve.

\* \* \* \* \*